S. RICHARDS.
Butter-Gages and Cutters.
No. 153,783. Patented Aug. 4, 1874.
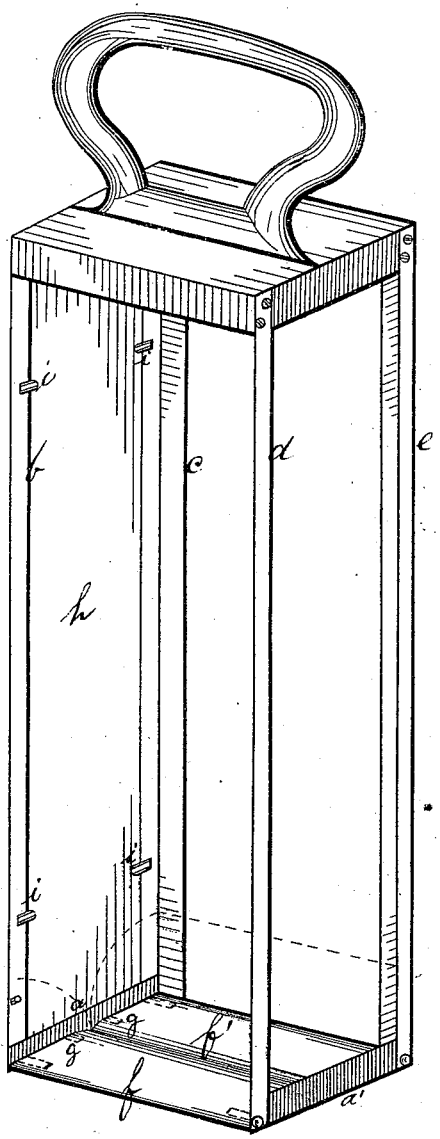

UNITED STATES PATENT OFFICE.

SAMUEL RICHARDS, OF PHILADELPHIA, PENNSYLVANIA.

IMPROVEMENT IN BUTTER GAGES AND CUTTERS.

Specification forming part of Letters Patent No. 153,783, dated August 4, 1874; application filed May 29, 1874.

CASE B.

*To all whom it may concern:*

Be it known that I, SAMUEL RICHARDS, of Philadelphia, Pennsylvania, have invented an Improvement in Butter-Cutters, of which the following is a specification:

The improvement herein described is a modification of the butter-cutter for which Letters Patent were allowed to me in April, A. D. 1874.

The said improvement consists in dispensing with the separate movable shelves, and in making two of the blades movable and attaching them to the corner-pieces or sides of the cuttter by flexible joints, so that these two blades become the supporting-shelves; second, in combining with the several other parts of the implement the movable or fixed sides.

The drawing represents a perspective view of the improved butter-cutter.

The blades $a$ and $a'$ are fixed rigidly to the inner sides of the corner-pieces $b\ c\ d\ e$. The blades $f$ and $f'$ are movable, being attached by a flexible joint to the corner-pieces, respectively, as shown. Their upper or inner edges are a little curved. and when turned down these blades form shelves which rest on pins or projections $g$ in the fixed blades $a$ and $a$, as shown. The sides of the implement are covered by removable plates, one of which, $h$, is shown in the drawing. These plates are provided with hooks $i$, which engage the corner-pieces $b\ c\ d\ e$, respectively, when they are slidden into their places, as shown.

Instead of making the side plates removable, as set forth, they may be rigidly attached to or may form parts of corner-pieces, as shown.

The movable blades $f$ and $f'$ occupy upright positions when the implement is inserted into the mass of butter to be cut, and as the implement is drawn out the blades $f$ and $f'$ are pressed down, describing the spaces indicated by the dotted lines, and resting on the projections $g$, and thereby forming the shelves for supporting the butter during the withdrawal of the implement.

The closed sides are only required when the implement is intended for cutting very soft materials, and in this form the implement may be employed to advantage for dredging purposes.

I claim—

1. The movable blades $f$ and $f'$, in combination with the corner-pieces or sides to which said blades are attached by flexible joints, the said blades of themselves thus constituting self-acting shelves to support the contents of the cutter when the cutter is being drawn out of the mass into which it has been inserted, substantially as set forth.

2. The combination of the movable or fixed sides with the elements above claimed, in the manner and for the purpose substantially as set forth.

SAMUEL RICHARDS.

Witnesses:
 THOS. A. BURTT,
 JNO. A. BELL.